United States Patent

[11] 3,627,861

| [72] | Inventor | Robert F. Timke |
| | | Fruitland Park, Fla. |
| [21] | Appl. No. | 754,137 |
| [22] | Filed | July 26, 1968 |
| [45] | Patented | Dec. 14, 1971 |
| [73] | Assignee | Accentile, Inc. |

[54] METHOD OF FORMING INDENTED DECORATIVE PATTERNS ON CERAMIC TILE
6 Claims, 8 Drawing Figs.

[52] U.S. Cl. .................................................. 264/56, 264/67, 264/132, 264/271, 264/278, 264/293, 264/313
[51] Int. Cl. .......................................... B28b 3/04, B28b 7/06, B28b 7/16
[50] Field of Search ........................................ 264/56, 67, 3.3, 132, 271, 278, 293; 25/20, 42

[56] References Cited

UNITED STATES PATENTS

| 744,374 | 11/1903 | Lugino ........................ | 264/313 |
| 1,666,232 | 4/1928 | Boynton ...................... | 264/313 |
| 2,039,488 | 5/1936 | McDonald ................... | 264/313 |
| 2,316,143 | 4/1943 | Peebles et al. .............. | 264/313 |
| 2,407,514 | 9/1946 | Rembert ...................... | 264/313 |
| 3,061,873 | 11/1962 | Supitilov et al. ............. | 264/313 |
| 3,218,376 | 11/1965 | Schindler, Jr. et al. ...... | 264/313 |
| 3,322,871 | 5/1967 | Noack et al. ................ | 264/61 |
| 3,222,748 | 12/1965 | Lamb .......................... | 25/42 |
| 2,890,514 | 6/1959 | Doran et al. ................. | 264/60 |
| 3,173,974 | 3/1965 | Mohr ........................... | 264/338 |

*Primary Examiner*—Julius Frome
*Assistant Examiner*—John H. Miller
*Attorney*—Beveridge & DeGrandi

ABSTRACT: Ceramic tile having indented decorative patterns on the exposed face are made in a conventional tile press. Prior to filling the mold with the ceramic mixture a thin elastomeric insert the same size as the bottom die and having raised portions of a desired pattern is placed in the mold with the raised portions facing upward. The mold is then filled with the mixture and the mixture is pressed against the elastomeric insert. The pressed tile-insert composite is then ejected in a conventional manner and in sliding the composite off of the bottom die the insert protects the pressed tile from any damage that could be caused by the sliding movement. The insert is removed from the pressed tile and the latter is trimmed, dried, glazed, and fired.

PATENTED DEC 14 1971       3,627,861
SHEET 1 OF 2
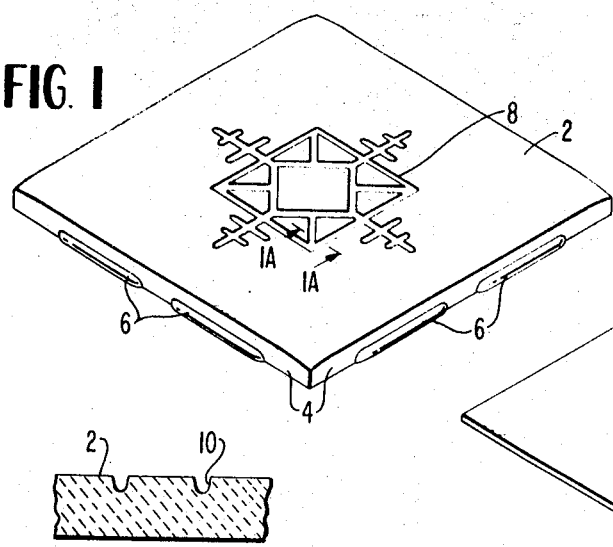
FIG. 1
FIG. 1A
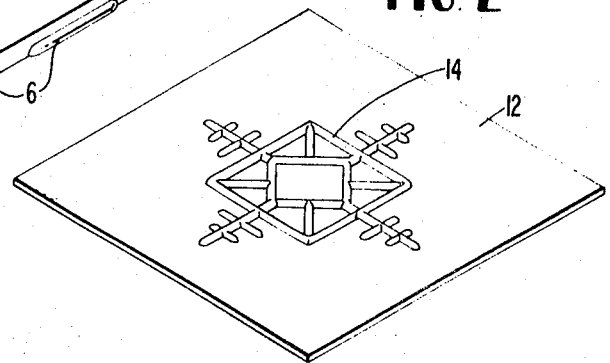
FIG. 2
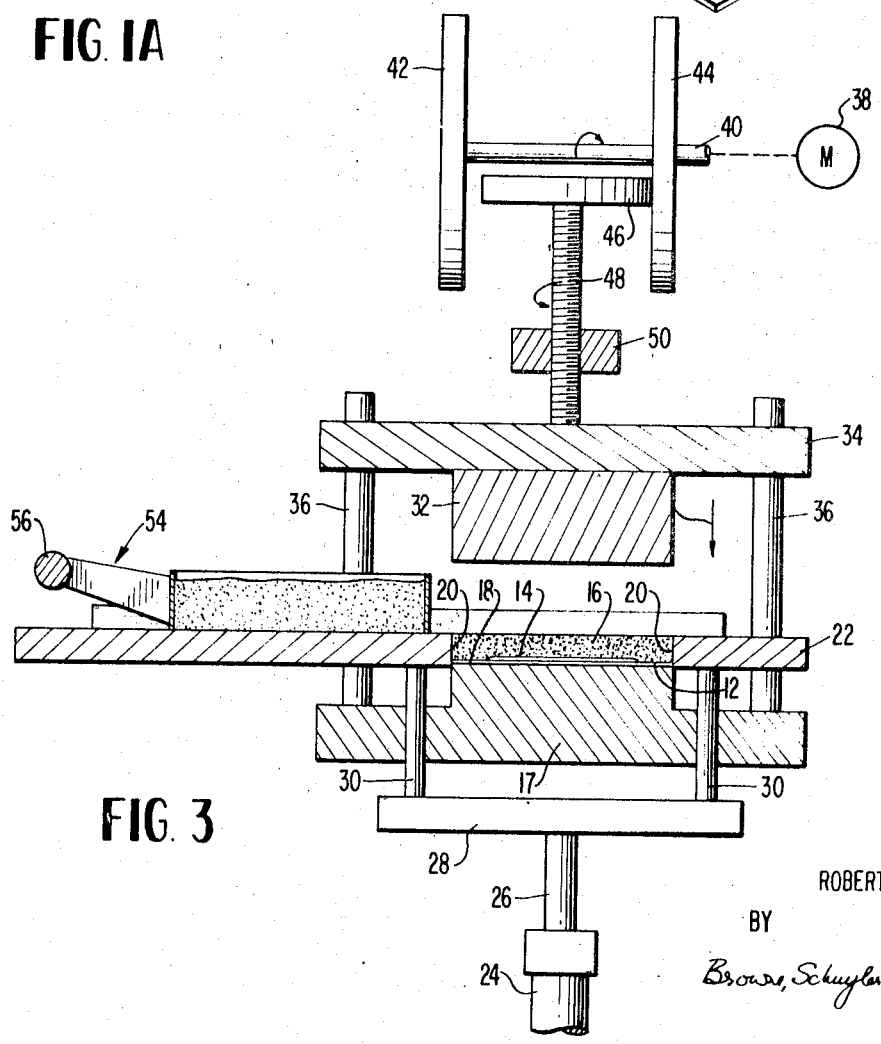
FIG. 3
INVENTOR
ROBERT F. TIMKE
BY
Browse, Schuyler & Beveridge
ATTORNEYS

METHOD OF FORMING INDENTED DECORATIVE PATTERNS ON CERAMIC TILE

BACKGROUND OF THE INVENTION

This invention relates to the manufacture of articles such as ceramic wall and floor tiles by compressing powdered materials in a die or mold which gives the articles their final desired configuration.

The conventional procedure for forming ceramic tiles is to form a powdered charge of clay, talc, wollastonite, pyrophylite and other finely ground mineral substances with about 6½ percent water by weight. The mixture which is in powdered form is compressed in a die or mold where it is united into a cohesive tile body which is strong enough to resist moderate handling. The tile is then trimmed, dried and coated with a glaze material. After being placed on refractory setters, the tiles are sent through a kiln for final firing.

Decorative effects in tiles have been obtained in the past by placing decalcomania transfer designs thereon after firing or by using various colors, textures, and blends of glazing materials prior to firing.

Other techniques for decorating the face of a tile have involved providing either the molding plunger or the bottom wall of the die cavity with areas of varying elevation in order to impart to the tile a pleasing texturing effect. Normally, however, the molding plunger is configured to impart to the tile an irregular rear face which promotes adhesion of the tile to mortar or mastic material during installation of the tile in a building. When the molding plunger is so configured, the bottom wall of the molding cavity may have a very slight textured surface, provided that the depth and the inclination of the textured portions do not interfere with the removal of the tile by sliding it parallel along the bottom wall of the mold.

Still another manner of modifying the tile to provide a decorative effect is mechanically to cut or otherwise scribe its surface after the tile body is removed from the molding cavity.

SUMMARY OF THE INVENTION

According to the present invention, a decorative effect is given to the face of a ceramic tile formed of compressed powders. This decorative effect is achieved by placing an insert member on the bottom wall of the molding cavity and then, after compression of the powder, simultaneously removing the cohesive tile body and the insert member. Another aspect of the invention involves an insert member within and coextensive with the bottom wall of of a molding cavity, and the subsequent removal of the tile body and the insert member by sliding the insert member across the bottom wall of the cavity.

Employment of this invention substantially reduces the expense of manufacturing ornamented ceramic tiles. More importantly, it permits the manufacture of such tiles with intricately designed patterns having a greater depth or bearing a greater angular relationship to the front face of the tile than heretofore has been attainable.

The adoption of this invention requires no substantial expenditure by the tile manufacturer since it is compatible with various existing machines for manufacturing tile and may readily be adapted to modern and automated machines for the same purpose. Practice of the invention does not interfere with the usual techniques whereby tiles are produced with spacer lugs extending from their sides near the rear wall thereof, nor does it prevent continuation of the common and important practice of providing ridges on the rear face of the tile to promote adhesion of the tile to mortar or mastic materials.

THE DRAWINGS

The drawings herein disclose the practice of the invention in conjunction with a simple and conventional tile forming press. More complicated machines having multiple die cavities and automatic devices for charging and discharging the die cavities may equally form the environment for the practice of the invention.

FIG. 1 shows a tile formed in accordance with the invention having a snowflake design on its outer face;

FIG. aA is a sectional view taken along line 1a–1a in FIG. 1, to show the depth to which the ornamental recesses may extend;

FIG. 2 shows a typical mold insert member capable of forming the design in the tile shown in FIG. 1;

FIG. 3 is a somewhat diagrammatic illustration of a ceramic tile molding press, modified according to the invention, and shown at a stage where the molding plunger is commencing its movement downwardly into the mold cavity;

DESCRIPTION OF THE PREFERRED EMBODIMENT

Figure 4:
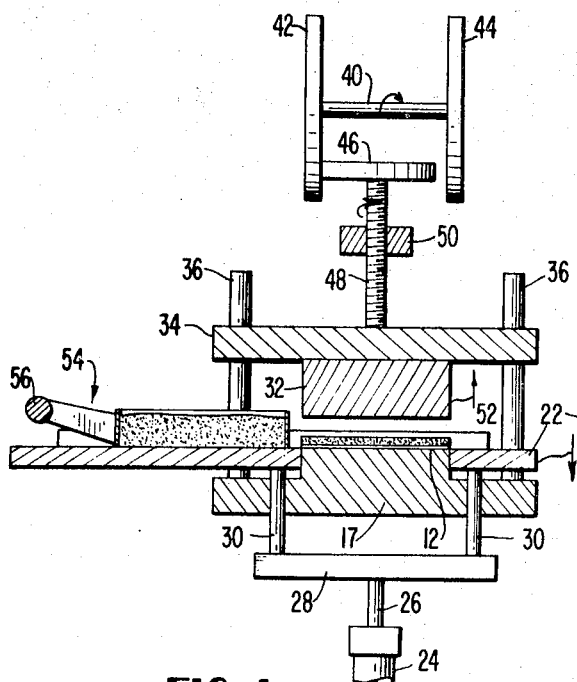
FIG. 4 shows the apparatus of FIG. 3 after compression of the powder into a cohesive tile body and after the sides of the tile body and the insert are exposed to facilitate their ejection from the tile press.

The tile made according to the invention is shown in FIG. 1 and includes the decorative front face 2, four sidewalls 4 and spacer lugs 6 on each of the sidewalls. The ornamental design 8 which appears on the face 2 of the tile is shown as a series of depressions but, alternatively, it may constitute a pattern of raised portions located on the front face of the tile. It is possible but not essential according to the invention that the inclined walls 10 of the ornamental design to be disposed at angles greater than 30° from the front face 2 of the tile. The particular manner in which the tile is formed permits the creation of a pattern which extends to a height or depth which may exceed 0.018 inch. Such depth cannot satisfactorily be produced on a mass production scale using prior art and apparatus, nor has it been possible in the past to have a substantial angular relationship between the walls of the design and the face 2 of the tile.

The mold insert on which the tile of FIG. 1 is formed is illustrated in FIG. 2. This insert member 12 may be formed of an elastomeric material such as rubber to facilitate its removal from the tile body. In any event the insert member 12 should be formed of or treated with a material which will prevent its adhesion to the compressed tile powder. Of course, the raised design 14 on the insert member 12 is formed of ridges having a height equal to the depth of the recesses in the tile.

FIG. 3 shows one suitable form of apparatus wherein the invention may be practiced. As illustrated, the die or molding cavity contains the uncompressed ceramic powder 16 and the mold insert member 12 with its raised design 14. The mold insert member 12 is supported on the member 17 which defines the bottom wall 18 of the molding cavity and remains stationary throughout the various phases of the molding and tile-ejecting operations. The insert member is coextensive with the bottom wall 18.

The sidewalls 20 of the molding cavity are formed by a vertically movable member 22 which in the ceramic tile field is normally called the "case." Vertical movement of the case may be effected by the fluid-operated cylinder 24 which has a plunger rod 26 connected through an arm 28 to the vertically movable rods 30 which support the case 22. As shown in FIG. 3, the case 22 is at its uppermost position. As explained in connection with the subsequent illustrations, it may be lowered to assist in removing the tile from the press.

The molding plunger 32 is movable vertically downwardly in order to compress the powder 16 in the molding cavity. The compression face of the molding plunger 32 will normally be provided with ribs or other irregularities which facilitate attachment of the tile during installation in a building.

The molding plunger 32 is supported on a vertically movable member 34 which together with the case 22 is guided and oriented by the vertical posts 36.

The mechanism for producing vertical movement of the molding plunger includes an electric motor 38 which rotates a shaft 40 carrying the spaced apart friction wheels 42 and 44. The friction wheels 42 and 44 maintain a constant spaced apart relationship but are capable of moving in the direction axially of the shaft 40, thus bringing either of the friction wheels 42 or 44 into driving engagement with a friction wheel 46 which rotates about a vertical axis. The wheel 46 is keyed to a threaded shaft 48 which, in turn, passes through a threaded aperture in a stationary member 50. The threaded shaft 48 is movable axially with the plunger supporting member 34 and is rotatable with respect thereto. Therefore, as the driven friction wheel 46 is in contact with the friction wheel 42, it will move the threaded shaft 48 and the plunger member 32 in one direction. Engagement between the friction wheels 44 and 46 will move the molding plunger 32 in an opposite direction. Other means may be used for actuating a molding plunger 32.

Completion of the stroke of the molding plunger 32 will result in compression of the powder 16 and its unification into a cohesive tile body which is capable of withstanding some forces without becoming damaged. Then, after the plunger is raised as shown in FIG. 4, the case 22 is lowered to expose the sides of the compressed tile body and the insert member. Similar relative movement between the sidewalls and bottom wall of the molding cavity may be accomplished by maintaining the case 22 in a stationary position and raising the member 17.

Figure 5:
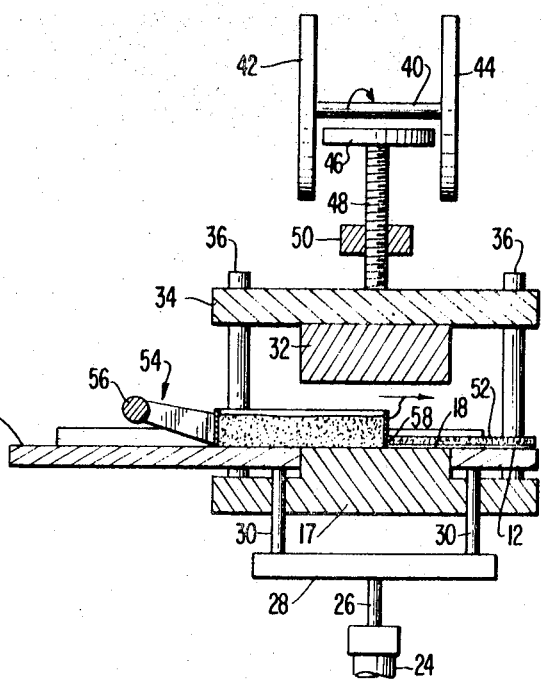
FIG. 5 depicts the apparatus of FIG. 3 at the stage where the cohesive tile body and mold insert member are being ejected simultaneously from the tile press.
Figure 6:
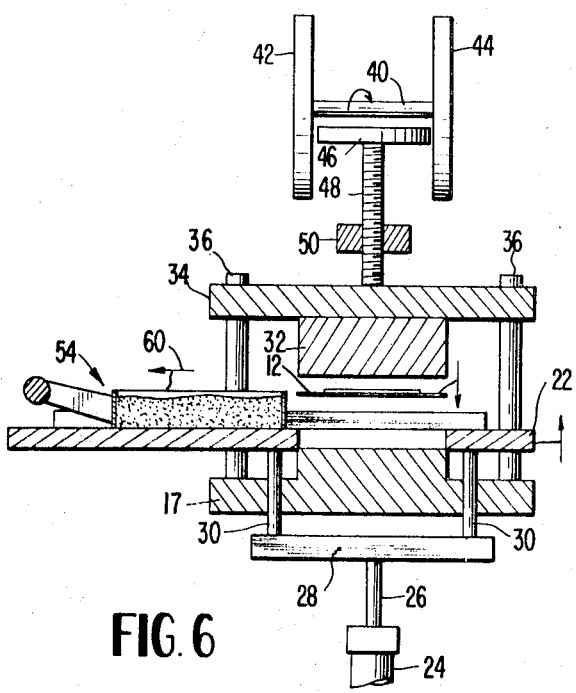
FIG. 6 shows the apparatus of FIG. 3 at a stage where a new insert member is being placed into the molding cavity.
Figure 7:
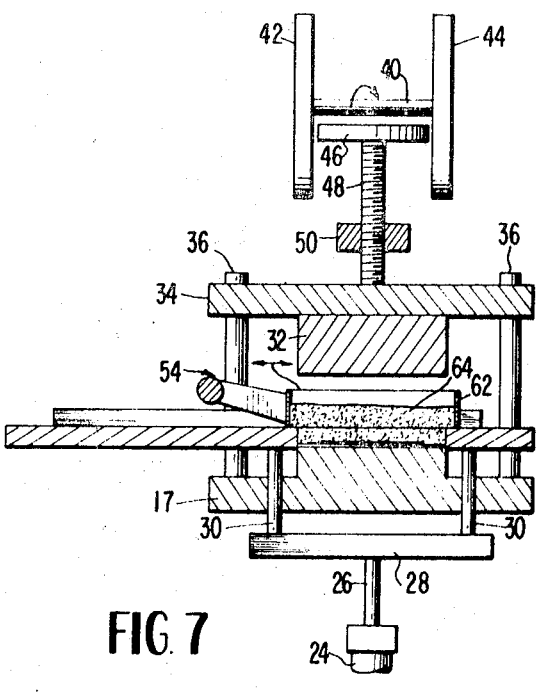
FIG. 7 shows the apparatus of FIG. 6 at a stage where another charge of molding powder is being deposited in the mold cavity.

Then as shown in FIG. 5 a slide assembly 54 which is movable with the case 22 is moved across the bottom wall 18 by an operator grasping the handle 56 so that its forward edge 58 contacts the exposed side edges of the insert 12 and tile body 52 to slidably eject them from the tile press. placed in Upon retraction of the slide assembly 54 to the left as shown by the arrow 60 in FIG. 6, the case 22 is raised by the cylinder 24 and another insert member 12 is placed in the molding cavity. The placement of a new charge of molding powder may be accomplished in various ways, one of which is illustrated in FIG. 7. There, it will be seen that the slide assembly 54 is moved to the right so that the shaker box 62 which is filled with loose powder 64 will overlie the molding cavity. At this point, the operator moves the shaker box 62 back and forth to ensure that the molding cavity is entirely filled. Then, the shaker box is retracted to the left to leave the charge of molding powder in the cavity in the state illustrated in FIG. 3. The compression step follows.

The aforementioned cycle may be repeated indefinitely and may vary somewhat according to the type of tile molding machine used. The easy replaceability of the insert members 12 permits the machine to be rapidly changed from production of one design to another with a minimum of expense, especially when contrasted to the substantial expense entailed in the construction of configured metal dies and the complications which would arise upon removing a formed tile body from such metal dies.

The processing of the tile after it leaves the press may take any conventional sequence. Of course, the insert member 12 is first removed from the tile. The insert may fall from the tile body during normal handling or it may be removed by a deliberate peeling step. Peeling of the insert from the tile body is facilitated by its flexibility. Then, the tile body 52 may be dried, glazed, fired and given any other suitable treatment.

The resulting product may be given an infinite variety of ornamental surfaces. The design may be pronounced series of recesses as shown in FIG. 1, or it may be raised portions assuming a similar configuration. The design may include very slight texturing or other patterns which will affect the appearance created when light strike the tile.

Many modifications and variations to the described embodiments will occur to those skilled in the art. The employment of this invention will offer designers a substantially greater degree of flexibility of the ornamentation of ceramic tile bodies. This invention is not limited only to the disclosed embodiments, but is inclusive of all variations and modifications falling within the broad terms of the claims which follow.

I claim:

1. The method of making a decorative tile comprising the steps of:
   a. placing clay powder in a mold having sidewalls and a bottom wall, with a solid elastomeric insert member supported by the bottom wall, said insert member being coextensive with the bottom wall and having a configured surface in contact with the clay powder for producing a decorative shape in a tile formed from the clay powder,
   b. compressing the clay powder within the mold to unify it into a cohesive tile,
   c. relatively moving the sidewalls and the bottom wall to expose the sides of the tile body and insert,
   d. pushing the exposed sides of the tile body and insert member to slide the insert member across the bottom wall and effect simultaneous removal of the tile body and the insert member from the mold,
   e. nondestructively mutually separating the insert member and the tile body, and
   f. firing the tile body.

2. The method of claim 1 including the step of moving a container filled with clay powder over said bottom wall concurrently with the pushing step.

3. The method of claim 1 wherein step (a) includes the placement of powder in depressions at the upper edges of the sidewalls; step (b) includes the compression of the powder in the depression to form spacer lugs in the cohesive tile body; and step (c) includes first producing downward relative movement of the sidewalls with respect to the bottom wall to expose sides of the tile and insert, and then pushing the exposed sides of the tile and insert to slide them across the bottom wall.

4. The method of claim 3 including the step of moving a container filled with clay powder over said bottom wall concurrently with the pushing step.

5. The method of claim 3 wherein ribs are formed in the upper surface of the tile body during the compression step (b).

6. The method according to claim 3 wherein during step (b) the configurated surface of the insert member impresses one substantially planar face of the tile body with a design which has portions lying at angles greater than 30° and portions lying at distances exceeding 0.018 inch from the plane of said face.

* * * * *